United States Patent [19]

Lindstrom

[11] Patent Number: 5,029,014
[45] Date of Patent: Jul. 2, 1991

[54] AD INSERTION SYSTEM AND METHOD FOR BROADCASTING SPOT MESSAGES OUT OF RECORDED SEQUENCE

[75] Inventor: James E. Lindstrom, 3 Butternut Dr., Wayne, N.J. 07470

[73] Assignee: James E. Lindstrom, Wayne, N.J.

[21] Appl. No.: 426,777

[22] Filed: Oct. 26, 1989

[51] Int. Cl.$^5$ .............................................. H04N 5/76
[52] U.S. Cl. ...................................... 358/342; 358/86; 358/335
[58] Field of Search ................. 358/86, 335, 342, 341, 358/343, 181–183, 142; 360/14.1, 14.2, 14.3, 72.1, 72.2, 79, 35.1, 34.1

[56] References Cited

U.S. PATENT DOCUMENTS

| | | | |
|---|---|---|---|
| 4,635,136 | 1/1987 | Ciampa et al. | 358/342 |
| 4,667,802 | 5/1987 | Verduin et al. | 194/217 |
| 4,675,755 | 6/1987 | Baurmeister et al. | 360/35.1 |
| 4,724,491 | 2/1988 | Lambert | 358/310 |
| 4,751,692 | 6/1988 | Giddings | 369/32 |
| 4,766,581 | 8/1988 | Korn et al. | 369/30 |
| 4,814,883 | 3/1989 | Perine et al. | 358/86 |
| 4,947,264 | 8/1990 | Narusawa | 358/342 |
| 4,951,155 | 8/1990 | Andrews | 358/342 |

OTHER PUBLICATIONS

"The Ad Machine" Brochure, Tele-Engineering Corporation.

Primary Examiner—Robert L. Richardson
Attorney, Agent, or Firm—Oliff & Berridge

[57] ABSTRACT

An ad insertion system and method transmit spot messages during intervals in a broadcast transmission and provide immediate access to stored spot messages, in any sequential order, with a single video source. Custom spot messages can be created by superimposing graphics over selected video signals and simultaneously transmitting those signals with appropriate audio signals.

19 Claims, 1 Drawing Sheet

AD INSERTION SYSTEM AND METHOD FOR BROADCASTING SPOT MESSAGES OUT OF RECORDED SEQUENCE

This invention relates in general to a system and method for the automatic insertion of advertisements or spot messages into a broadcast transmission. More specifically, the invention is directed to a compact and inexpensive system and method for creating and transmitting spot messages which are both simple and reliable in operation.

BACKGROUND OF THE INVENTION

Techniques of inserting prerecorded spot messages into broadcast transmissions have been known. For example, advertising insertion systems for television broadcasts include a plurality of video tape players which contain video tapes bearing commercial messages and control means for selecting prerecorded commercial messages from the plurality of video tape players. U.S. Pat. No. 4,724,491 to Lambert discloses such an ad insertion system.

Since video tape machines usually retrieve or set-up the next spot message during the transmission of a local or remote scheduled program or of the preceding spot message, video tape systems require either a special editing step to prepare the desired series of messages in a recorded sequence or a plurality of video tape machines to transmit a series of spot messages out of the recorded sequence from separate video tapes. Specifically, a video tape machine pre-positions one spot message or recorded series of spot messages at a time and requires a substantial period of time to do so. Accordingly, a plurality of video tape machines, each containing the same recorded sequence of commercial messages, is commonly used to transmit successively a series of commercial messages out of their recorded sequence. Otherwise a substantial time delay would occur between each scheduled spot message of a series while the single video tape machine advances or rewinds to the next scheduled commercial message.

Video tape machine insertion systems require time before each spot message to position (advance or rewind) the tapes so that desired spot messages can be accessed for transmission at the appropriate time when transmitted out of the recorded sequence. Even with this set-up time, video tape machines are, at best, ±3-5 frames off from the lead frame. To compensate for this approximate frame accuracy, video tape systems conventionally include a number of black frames before and after each spot message or recorded series of spot messages in the master tape. A special editing process is necessary to record the black signals on the tape.

Moreover, this system requires the video tapes to be repeatedly stopped, advanced and rewound in order to set-up and then play selected commercial messages. This repeated play of tapes causes them to stretch, break and wear out, thus necessitating additional back-up tapes and the presence of operating personnel to maintain the quality of the video broadcast, and to ensure continued broadcast of the commercial message schedule.

Mention has been made of an ad insertion system which may include laser disk players in "The Ad Machine" brochure of Tele-Engineering Corp. This ad insertion system employs at least two players (preferably, video tape machines) and a random access controller to cue-up and play spot messages. One master tape is required, and each player accesses spot messages from a duplicate of the master tape.

Conventional ad insertion systems and methods commonly rely upon advertiser supplied commercial messages which are filmed at a studio and then are edited into a master video tape which contains a plurality of such commercial messages. Each advertiser-supplied commercial message is commonly produced for a particular advertiser and may include the services of an advertising agency, film crew and actors, in addition to the expense of actually producing and editing the finished commercial message. Local advertisers cannot usually afford the production cost of these live action messages, and thus these spot messages are not readily available to local advertisers. While still-frame commercials (i.e., motionless video with accompanying audio) are known, this type of advertising is often ineffective in generating consumer interest in the promoted product. There still exists a need in the broadcast industry for inexpensive and effective full-motion commercials or spot messages and a reliable ad insertion system.

SUMMARY OF THE INVENTION

The present invention solves the above and other disadvantages associated with the prior art by providing an ad insertion system and method which can create inexpensive spot messages and/or transmit a series of spot messages, out of recorded sequence, economically and automatically into a scheduled broadcast transmission.

The invention provides an ad insertion system comprising a single playing means having immediate access to any recorded spot message on a single video source stored therein so that a series of recorded spot messages can be consecutively transmitted in any sequential order; without noticeable intervals between two sequential spot messages. Moreover, the instant invention provides frame accurate accessing of video material and switching between broadcast transmissions, thus eliminating prior art switching problems into and out of commercial message intervals.

The invention also creates inexpensive custom advertiser spot messages that enable local advertisers to promote their products in a full-motion spot message with actors, graphics, and other options associated with professionally made commercials, without time consuming and expensive producing and filming. The resultant spot messages can be transmitted into a scheduled audio/video program signal.

DETAILED DESCRIPTION OF PREFERRED EMBODIMENTS

Figure 1:
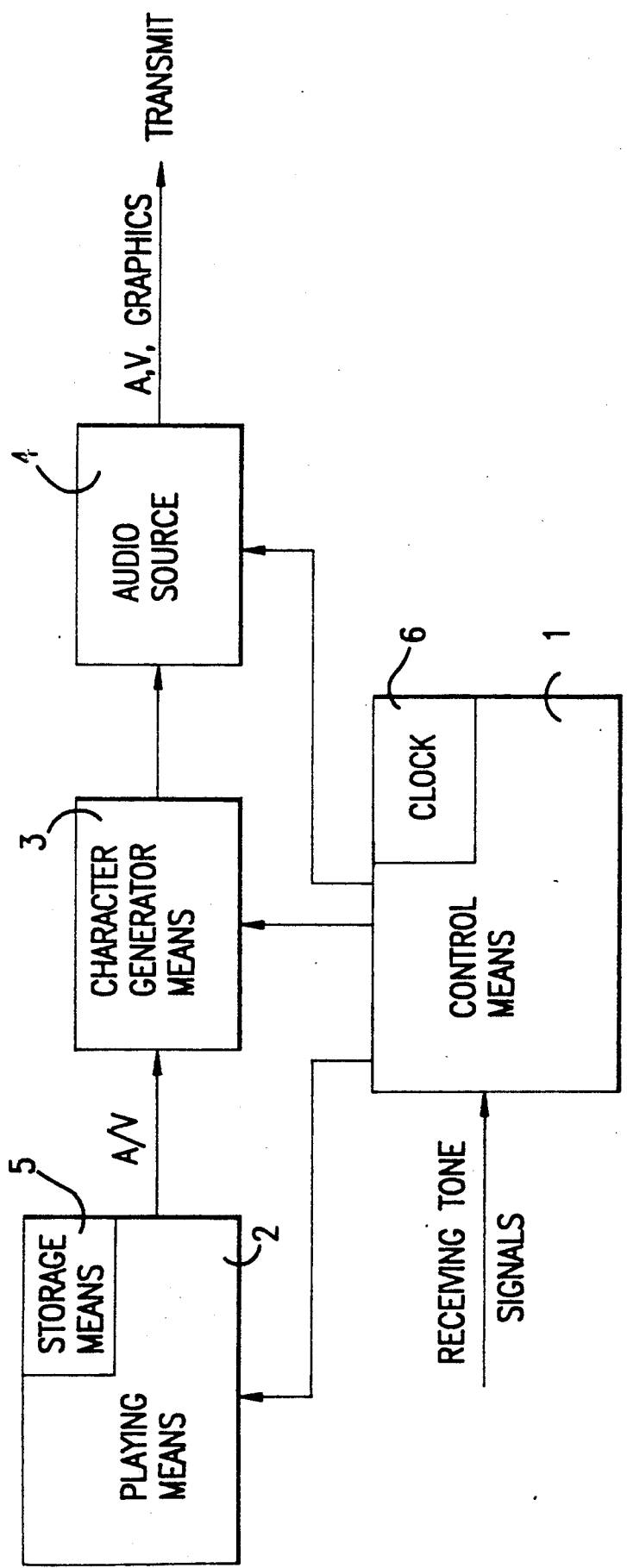
FIG. 1 is a block schematic diagram of an ad insertion system according to the invention.

In the inventive system, a controller is programmed to access a series of recorded spot messages out of their recorded order from a single video source. The controller accesses the spot messages according to a programmed schedule to form the series of spot messages. After the first scheduled spot message is played, a second spot message is accessed from the same video source and then is played. This process continues for each scheduled spot message, thus enabling a series of messages to be transmitted successively out of their recorded sequence. Since the spot messages can be accessed and immediately played in any sequential order in the instant invention, without any noticeable time interval between two consecutive spot messages, the programmed schedule of spot messages can be easily revised without editing the video source or providing an additional player. Thus, recorded or stored spot messages can be transmitted in varying sequential groups.

With reference to FIG. 1, there is shown a block diagram illustrating the arrangement of a system according to a preferred embodiment of the invention. Tone signals, indicating the imminent availability of a spot message interval generated by a network which is broadcasting scheduled audio/video program signals, are received by control means 1. These tone signals indicate that a program transmitted from a remote network will be interrupted within a time set by the network to allow transmission of local spot messages (e.g., commercials or other interstitial materials).

In a video tape system, after a tone signal has been received, a local spot message transmission system pre-rolls the video tape containing a previously retrieved spot message in order to prepare the machine and tape for transmission at the desired time. The ad insertion system according to the invention, however, does not require a "pre-roll" since it is characterized by rapid, accurate retrieval and quality transmission of the selected audio/video signal corresponding to a spot message. Thus, the ad insertion system and method of the invention can work with or without the pre-roll time allowance of conventional systems. If used with a network which provides such a pre-roll time, the system may be programmed to await the expiration of a predetermined time before beginning to play a first spot message.

The basic ad insertion system of the invention comprises control means 1, and playing means 2 with storage means 5. The ad insertion system can work with a single playing means having a single video source in the storage means or with plural playing means. When employing an ad insertion system having plural playing means, selected playing means can have a separate video source with different video messages. The video source of a playing means can optionally include an accompanying sound track (audio signals). To enable broadcast of custom spot messages, character generating means 3 and an additional or separate audio source 4 can be added.

In a basic embodiment of the instant invention, a plurality of video spot messages, with or without accompanying sound track, is stored in storage means 5. Playing means 2 accesses any stored video spot message within the storage means in response to commands from control means 1 so that video spot messages can be transmitted in any sequential order.

The spot messages can be accessed by playing means 2 within a half second or less by frame or time code in the single video source in storage means 5. Thus, the inventive ad insertion system provides immediate access to any spot message stored within storage means 5 and does not require advancement or rewinding of video tape material which slows down access to spot messages within the storage means.

Control means 1, in response to a programmed schedule which may be incorporated into a floppy disk, selects a series of spot messages from the plurality of spot messages stored in the storage means 5. Control means 1 can be programmed to select spot messages from a single playing means or a plurality of playing means to form any possible series of spot messages from the available stored messages. When audio/video signals corresponding to a recorded spot message are accessed by playing means 2, control means 1 switches from the local or remote broadcast audio/video program signals to the signals generated by playing means 2. Switching means electrically connected to the output of each playing means 2 and/or character generating means, and control means 1 enable the control means to select either program broadcast transmission or transmission of a series of spot messages output by the instant invention. Since playing means 2 immediately and accurately accesses the programmed spot message at the first video frame of the track, the switching between remote broadcasting of program signals to local spot message transmission can be achieved with constant video transmission. Consequently, there is no need to store or record black signals in the single video source. Moreover, if a black signal is desired, the controller can be programmed to provide such a signal. Thus, the single video source of the instant invention does not require special editing to provide black signals.

Control means 1 can also have a clock 6 which internally times when a scheduled spot message is to be transmitted. Optionally, control means 1 can be programmed to transmit a scheduled spot message only after receipt of a remote network's tone signal indicating the availability of a local spot message interval. Each network has a unique tone signal which indicates the predetermined period of time that network employs for its pre-roll time. Controller 1 may be programmed to determine the pre-roll time associated with each network's tone signal and upon receiving a tone signal, clock 6 counts the time between receipt of signal and transmission of a spot message. In this system, clock 6 provides synchronization between the remote broadcasting network and the local spot messages which are to be inserted by the ad insertion system. If no tone is received, the scheduled commercial for that time slot is not played. Any commercial computer or control means known in the broadcast industry can be used in the invention.

The programmed schedule which determines the particular series of audio and video signals selected by the control means and the transmitting time of a spot message broadcast can be operator designed with a personal computer or other conventional programming means. The spot message schedule can be a simple software program that enables operators to easily change or select their own sequence of spot messages, while keeping an inventory of spot messages on storage means 5. Thus, an operator can easily change the number of messages and the sequence of play of the messages. As described below, this programming means is highly useful in providing operators with inexpensive but effective spot messages made particularly for local merchants. The spot message schedule can also be programmed at a service center for a particular operation.

In addition to the above-described basic components, audio source means 4 can be added which, for example, stores special audio signals drawn to a particular local advertiser to produce a custom spot message by combining stored audio and video signals. These additional audio signals are simultaneously broadcast with video signals generated by playing means 2. The ad insertion system and method of this embodiment can combine a series of video signals in full motion with specially prepared audio or generated graphic signals to create a plurality of video and audio signals corresponding to custom live action spot messages, and then automatically insert the resultant spot messages into a broadcast transmission.

Custom spot messages are produced with a video source, at least one audio source and/or graphics. The ad insertion system and method enable stored video signals corresponding to spot messages to be retrieved and audio signals and/or graphics to be superimposed over the accessed video signals to personalize the video message for a local advertiser. Advertiser-specific audio signals from a separate source can also be transmitted simultaneously with the video signals. An optional sound track can accompany the video from the video source.

The ad insertion system of this inventive embodiment incorporates single audio/video playing means 2 having immediate access to any spot message stored therein, audio source means 4 for storing or generating local advertiser audio signals; and control means 1. Control means 1 is programmed for selecting appropriate audio and video signals, and for switching from the local or remote scheduled audio/video program signals to the spot messages, thereby transmitting the spot messages inexpensively.

To further customize a spot message, character generating means 3 can be added for adding graphics. The graphics can be superimposed over the transmitted video and simultaneously broadcast with the video and audio signals.

The character generator is preferably the Amiga personal computer manufactured by Commodore which provides excellent graphics. The character generating means can format identifying promotional information in various fonts and character sizes.

A program schedule within control means 1 can select the appropriate video, audio and graphic signals and switch from the scheduled program signals to the selected signals, thereby creating custom spot messages and transmitting the resultant custom spot messages. More than one video player can be employed in this invention to provide a larger selection of stored video messages. In such an embodiment, control means 1 can be programmed to select video signals from any of the players, without a substantial time delay between the desired video signals of each scheduled spot message. There is no need for the same spot messages to be stored in more than one player.

In a preferred embodiment, this system can automatically insert a video signal in slow motion, with or without sound, or store or hold the previous frame while continuing transmission to create a stepping or mosaic effect, thus further modifying the video signals without costly editing procedures. When the slow motion special effect or other effect is stopped, audio/video signals and speed automatically return to the recorded speed without any video distortion. Thus, the instant invention provides less expensive spot messages in addition to a compact and inexpensive ad insertion system which is both simple and reliable in operation.

The preferred ad insertion system of FIG. 1 can utilize optical laser disk technology for storage and rapid retrieval of pre-recorded spot messages. With this system, recorded spot messages can be transmitted, out of their recorded sequence, as a group into a broadcast transmission without time delays or requiring a plurality of players containing the same recorded material. In the preferred embodiment, the 8000 Laser Disc Player manufactured by Pioneer is employed as laser disk player 2. An optical laser disk is used for storage of the spot messages to be transmitted. A single half-hour laser disk can store, for example, sixty 30-second commercials which are to be played at breaks in the scheduled program.

There are two types of laser disks, CAV (constant angular velocity) and CLV (constant linear velocity), which have different storage and retrieving systems to access prerecorded material. The ad insertion system of the present invention can access spot messages stored in either type of commercially available disk and immediately, successively transmit the accessed messages to form a combined series of spot messages.

A further embodiment of the invention employs at least one optical laser disk player and at least one other player such as a tape player, but preferably another one or more disk players, where the controller can access spot messages from both the laser disk player and the other players to form a series of messages to be transmitted without noticeable intervals between successive messages.

The method of inserting a series of spot messages, out of their recorded sequence, into a broadcast transmission comprises the steps of accessing a first spot message from storage means in a single playing means, switching from program broadcast transmission to spot message transmission to transmit the first spot message, accessing the next spot message from the same storage means in the same playing means, and transmitting that next spot message without noticeable intervals between spot messages of the series. This process continues until the desired series of spot messages has been transmitted. The schedule of the spot messages can be programmed in a service center or on location by an operator on a conventional personal computer to establish the order of spot messages and the particular time slot at which each spot message is to be transmitted. Optionally, the schedule may be activated by a tone signal from a remote network indicating a spot message interval.

Control means 1 times the occurrence of the tone signal and then counts down to transmission time of the scheduled first spot message of the series through the use of clock 6 which may be a real-time clock. During the countdown or during the program transmission, player 2 accesses the first spot message scheduled, to be transmitted after the received tone signal. In the event a custom spot message is scheduled, control means 1 causes playing means 2, audio means 4, and/or character generating means 3 to access the appropriate signals according to the programmed schedule. The video signals are accessed by playing means 2 by either a time code or chapter number corresponding to their position on the video source.

After the first spot message is transmitted, the second spot message is accessed and transmitted without a noticeable interval between messages. If more than one playing means is employed, the spot message on a different video source can be set-up during the program transmission or while a spot message stored on another video source is being played. However, the invention does not require more than one playing means as more than one spot message can be transmitted out of recorded sequence from an individual playing means.

The last video frame of each broadcast transmission, either scheduled program signals or spot messages, may be held during the switching of broadcast signals or prior to the transmission of the next spot message. Thus, the last video frame switches immediately to the first video frame of the accessed spot message or other broadcast transmission, thereby avoiding transmission of a black signal between consecutive spot messages or broadcast signals. This switching step is smooth and without any noticeable video effects.

Alternatively, a black signal virtually unnoticeable to a viewer could be transmitted between spot messages or between a spot message and other broadcast signals to provide smooth transition therebetween. This black signal can be generated by control means 1 or a local program switch, and thus need not be stored on the video source.

The inventive ad insertion system can selectively access and transmit all possible series of spot messages from among a plurality of spot messages stored in a single storage means, in any sequential order. The ad insertion system and method provide accurate and consistent insertion of spot messages. The storage means can ensure consistent quality of the stored spot messages despite numerous and repeated transmissions of the same spot messages. Moreover, the invention enables the transmission of inexpensive custom spot messages for local advertisers and is highly reliable.

The preferred embodiments and modes of operation of the ad insertion system and method in accordance with the present invention have been described in the foregoing specification. The invention, however, is not to be construed as limited to the particular forms disclosed, since those forms are to be regarded as illustrative rather than restrictive. Variation and changes may be made by those skilled in the art without departing from the spirit of the invention.

What is claimed is:

1. An ad insertion system comprising:
a first playing means for playing spot messages stored in a recorded sequence on a video source, and
control means for switching a broadcast system from program signals of a scheduled broadcast, selecting and causing said first playing means to play into said broadcast system in immediate succession a plurality of spot messages out of said recorded sequence without intervening material from another playing means, and switching said broadcast system back to program signals of a scheduled broadcast.

2. The ad insertion system according to claim 1, further comprising an audio source separate from said playing means and video source.

3. The ad insertion system according to claim 1, comprising only a single playing means.

4. The ad insertion system according to claim 1, wherein said playing means comprises an optical laser disk player and said video source is an optical laser disk.

5. The ad insertion system according to claim 4, further including character generating means for co-broadcasting graphics with selected spot messages.

6. The ad insertion system according to claim 1, wherein said control means is programmed to switch from a video signal of a first spot message to a video signal of a second spot message while continuously transmitting a final video frame of said first spot message.

7. An ad insertion system comprising:
a single laser disk player for playing a plurality of video signals stored on a laser disk;
audio source means separate from said laser disk player for generating audio signals for broadcast with said video signals; and
control means for selecting said video and audio signals, thereby creating spot messages, switching from program signals of a scheduled broadcast to said selected signals, playing into a broadcast system said spot messages out of a pre-recorded sequence on said laser disk, and switching back to program signals of a scheduled broadcast.

8. The ad insertion system according to claim 7, further comprising:
character generating means for generating stored graphics signals to be simultaneously broadcast with said video and audio signals;
wherein said control means is programmed to select said video, audio and graphics signals to create spot messages.

9. The ad insertion system according to claim 7, wherein said control means is programmed to cause said laser disk player to play the video signals of said spot messages in full motion.

10. The ad insertion system according to claim 7, wherein said said control means is programmed to cause said laser disk player to play video signals of said selected spot messages in slow motion with or without accompanying audio signals, and automatically return to real-time motion and audio without any noticeable video distortion.

11. A method for inserting a series of spot messages into a broadcast transmission, comprising:
switching a broadcast system from program signals of a scheduled broadcast;
transmitting a first spot message from first storage means in a first playing means;
accessing a second spot message out of a recorded sequence from said first storage means and transmitting said second spot message immediately after said first spot message; and
switching said broadcast system back to program signals of a scheduled broadcast.

12. The method according to claim 11, wherein said first playing means is an optical laser disk player.

13. The method according to claim 11, further comprising generating and transmitting a black signal while accessing said second spot message.

14. The method according to claim 11, further comprising transmitting a final video frame of said first spot message while accessing said second spot message.

15. A method according to claim 11, further comprising transmitting at least one third spot message from second storage means in a second playing means, said first storage means and said second storage means containing different spot messages.

16. A method for inserting spot messages into a broadcast transmission, comprising:
selecting video, audio and/or graphic signals to form custom spot messages;
accessing the selected video signals on a laser disk;
accessing selected audio signals which are to be simultaneously broadcast with said accessed video signals; and
switching from broadcast transmission to spot message transmission to co-broadcast said accessed video and audio signals as said spot messages with an audio component according to a programmed time schedule and out of a pre-recorded sequence of spot messages on said laser disk.

17. The method according to claim 16, further comprising superimposing graphics over the accessed video signals to co-broadcast a video message with graphics.

18. A controller for an ad insertion system programmed to switch a broadcast system from program signals of a scheduled broadcast, cause a single player to access and then play in sequence, non-sequential spot messages stored in a single video source, and switch said broadcast system back to program signals of a scheduled broadcast.

19. A controller according to claim 18, wherein said single player is an optical laser disk player and said single video source is a laser disk.

* * * * *